(12) United States Patent
Nakagomi

(10) Patent No.: US 7,562,756 B2
(45) Date of Patent: Jul. 21, 2009

(54) CLUTCH DRUM AND METHOD FOR MANUFACTURING SUCH CLUTCH DRUM

(75) Inventor: Hirofumi Nakagomi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 241 days.

(21) Appl. No.: 11/385,443

(22) Filed: Mar. 22, 2006

(65) Prior Publication Data
US 2006/0213746 A1 Sep. 28, 2006

(30) Foreign Application Priority Data
Mar. 28, 2005 (JP) ............................... 2005-091713

(51) Int. Cl.
*F16D 13/52* (2006.01)
(52) U.S. Cl. .................. 192/70.2; 192/113.3; 184/6.12; 74/468
(58) Field of Classification Search ............... 192/70.12, 192/70.2, 113.3; 184/6.12; 74/438, 467, 74/468
See application file for complete search history.

(56) References Cited

U.S. PATENT DOCUMENTS

| | | | | |
|---|---|---|---|---|
| 3,760,921 A | * | 9/1973 | Gillespie ................. | 192/107 R |
| 4,716,756 A | * | 1/1988 | Fujioka et al. ............ | 72/353.4 |
| 4,989,708 A | * | 2/1991 | Gaggermeier .............. | 192/70.2 |
| 5,439,087 A | * | 8/1995 | Umezawa .................. | 192/70.2 |
| 5,642,958 A | * | 7/1997 | Sugiyama ................ | 403/359.6 |
| 5,896,970 A | * | 4/1999 | Prater ......................... | 192/70.2 |
| 6,405,835 B1 | * | 6/2002 | Satou et al. ................ | 188/71.5 |

FOREIGN PATENT DOCUMENTS

JP        2000-205294 A        7/2000

* cited by examiner

*Primary Examiner*—David D. Le
(74) *Attorney, Agent, or Firm*—Miles & Stockbridge P.C.

(57) ABSTRACT

A clutch drum for a multi-plate clutch in an automatic transmission is provided at an inner periphery thereof with splines by which friction plates are engaged. Each of the splines has a tooth tip having two circumferential ends. Only one of the circumferential ends of the tooth tip has a curved surface. The splines of the clutch drum may be formed by form rolling using a tooth forming tool including a tooth root. The tooth root may have a circumferentially leading end and a circumferentially trailing end in a rotational direction, with only the circumferentially leading end having a curved surface.

5 Claims, 3 Drawing Sheets

CLUTCH DRUM AND METHOD FOR MANUFACTURING SUCH CLUTCH DRUM

This application claims priority from Japanese Patent Application No. 2005-091713 filed on Mar. 28, 2005, which is hereby incorporated by reference herein.

BACKGROUND OF THE INVENTION

1. Field of the Invention

The present invention relates to a clutch drum of a multi-plate clutch used in an automatic transmission and the like, and a multi-plate cultch having such a clutch drum. Further, the present invention relates to a method for manufacturing such a clutch drum.

2. Related Background Art

In general, a wet type multi-plate clutch is incorporated into an automatic transmission used in an automatic vehicle and the like. Such a clutch includes a clutch drum as a cylindrical rotary member having one open end. The clutch drum is connected to an input member. As shown diagrammatically in FIG. 6, the clutch drum 100 is provided at its interior with plural friction plates 105 and separator plates 106 which are alternately arranged along an axial direction. Further, a piston 107 is disposed within the clutch drum 100.

In the multi-plate clutch so designed, when operating oil pressure is applied to the piston, the friction plates and the separator plates are urged by the piston to be closely engaged with each other. As a result, the clutch drum connected to the input member, the friction plates, the separator plates and an output member are rotated integrally. By such an operation of the clutch, torque of an engine is transmitted from the input member to the output member.

The clutch drum comprises a disc portion and a cylindrical portion extending vertically from an outer periphery of the disc portion. An inner peripheral surface of the cylindrical portion is provided with splines into which the friction plates or the separator plates are fitted. That is to say, the friction plates or the separator plates can be shifted along the splines in an axial direction.

In many cases, such splines are formed by form rolling rather than cutting in order to maintain strength and to reduce the cost. By forming the clutch drum in this way, a clutch drum with splines having high accuracy and high strength can be manufactured.

As mentioned above, although the multi-plate clutch is set in the clutch drum, a radius R of a tip of each of splines of the clutch drum is decreased in order to increase a contact area between the splines of the clutch drum and the splines of the multi-plate clutch as much as possible to transmit the torque. For example, such an example is disclosed or illustrated in Japanese Patent Application Laid-open No. 2000-205294 and in FIG. 5 of this application.

In the general form rolling, as shown in FIG. 5, a cup-shaped clutch drum 100 is worked by the form rolling by using an apparatus comprising a mandrel to which a shaping tool 102 with a tooth profile is mounted, and a pressure roller 101, thereby forming splines in an inner periphery of the clutch drum 100.

A cup-shaped work is mounted on the mandrel to which the shaping tool is mounted and which is rotatingly driven. When a single pressure roller or plural pressure rollers are shifted in an axial direction, metal flow forming is caused between the mandrel or the shaping tool and the single pressure roller or the plural pressure rollers. In this case, a thickness of the work is decreased and a length of the work is increased and also a tooth profile is formed on an inner diameter surface of the work, thereby forming the clutch drum.

In this case, particularly, tooth roots of the tooth profile of the mandrel or the shaping tool and corresponding tooth tips of the tooth profile of the clutch drum are subjected to excessive stress, with the result that, for example, in an area A shown in FIG. 5, the tooth root of the tooth profile shaping tool on the mandrel is damaged or cracked and the tooth tip of the drum is scratched.

SUMMARY OF THE INVENTION

Accordingly, an object of the present invention is to provide a clutch drum and a method for manufacturing such a clutch drum, in which sufficiently great torque can be transmitted and in which a forming tool for form rolling is hard to be damaged.

To achieve the above object, the present invention provides a clutch drum which is provided at its inner periphery with splines by which friction plates are engaged and wherein each of the splines has a tooth tip having a curved surface at one circumferential edge thereof.

Further, to achieve the above object, the present invention provides a method for manufacturing a clutch drum provided at its inner periphery with splines, the method being characterized in that the splines are formed by form rolling by using a tooth profile shaping tool having tooth roots each of which has a curved surface at a circumferential edge thereof.

Further, to achieve the above object, the present invention provides a clutch apparatus comprising a clutch drum provided at its inner periphery with splines, a plurality of friction plates each of which is provided at its outer periphery with teeth engaged by the splines, separator plates arranged alternately with the friction plates in an axial direction, and a piston for applying an urging force in order to engage the friction plates and the separator plates with each other and wherein each of the splines has a tooth tip having a curved surface at one circumferential edge thereof and each of teeth of the friction plate has a tooth root having a curved surface at one circumferential edge thereof, and the tooth tip and the tooth root are complementary to each other.

The present invention provides the following effects.

By increasing the curved surfaces at the side edges of the teeth of the clutch drum, which does not contribute to transmit the torque, since the curvatures of the tooth roots of the shaping tool can be increased, the excessive stress can be avoided during the form rolling, thereby preventing the damage of the shaping tool. Further, by using the side edges of the teeth of the clutch drum opposed to the curved edges as the torque transmitting surfaces, surface pressure of the tooth surfaces can be reduced, thereby preventing indentation.

As an additional effect, since the gap is created between the tooth tip of the clutch drum and the friction plate, the gap can also be used as an oil path for lubricating oil in the multi-plate clutch or as an oil discharge passage in a clutch pack, thereby contributing to reduction of drag torque and enhancement of a cooling effect during the idle rotation.

Since each of the splines has a tooth tip having a curved surface at one circumferential edge thereof and each of teeth of the friction plate has a tooth root having a curved surface at one circumferential edge thereof, and the tooth tip and the tooth root are complementary to each other, when the friction plates each of which has a friction material fixed to only one surface thereof are assembled, reverse arrangement of any friction plate can be prevented.

DESCRIPTION OF THE PREFERRED EMBODIMENTS

Figure 1:
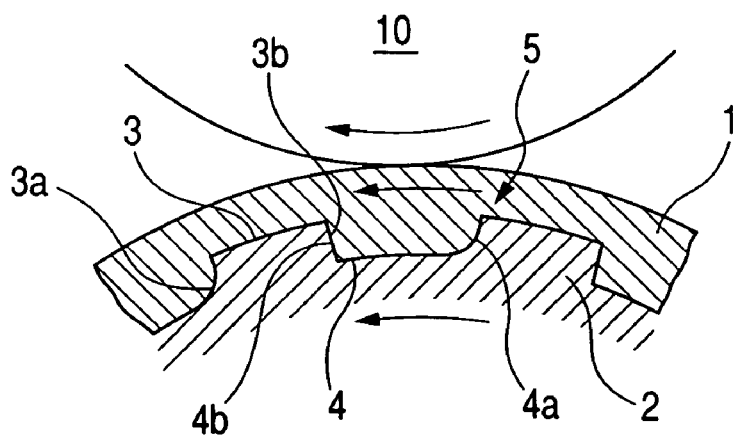
FIG. 1 is a sectional view showing an embodiment of the present invention.

Now, embodiments of the present invention will be fully explained with reference to the accompanying drawings. Incidentally, in the drawings, same or similar elements are designated by the same reference numerals. Further, embodiments which will be described later are merely exemplary and do not limit the present invention in all senses.

FIG. 1 is a sectional view showing an embodiment of the present invention and also showing a condition that splines are formed in a clutch drum by a shaping tool. A cylindrical clutch drum 1 is interposed between a shaping tool 2 having a plurality of teeth 3 extending in an axial direction and a roller 10. When the roller 10, clutch drum 1 and shaping tool 2 are rotated in directions shown by the arrows in FIG. 1 and the roller 10 is shifted in the axial direction, as shown in FIG. 1, the clutch drum 1 provided at its inner periphery with a plurality of splines 5 extending in the axial direction is formed.

The roller 10 is urged against an outer peripheral surface of the clutch drum 1 by an urging mechanism (not shown) while rotating around the outer peripheral surface of the drum. In FIG. 1, although the single roller 10 is shown, a plurality of rollers may be arranged on the outer peripheral surface of the clutch drum 1 along a circumferential direction.

A tooth root of each tooth 3 provided on an outer periphery of the shaping tool 2 has, at its circumferential one edge thereof, a curved surface portion 3a having a predetermined curvature. The other edge of the tooth 3 forms a substantially right angle corner portion 3b. A tooth root of each tooth 4 of each spline 5 of the clutch drum 1 formed by form rolling by means of the shaping tool 2 has, at its circumferential one edge thereof, a curved surface portion 4a having a predetermined curvature. Further, the other edge of the spline tooth forms a substantially right angle corner portion 4b.

Figure 5:
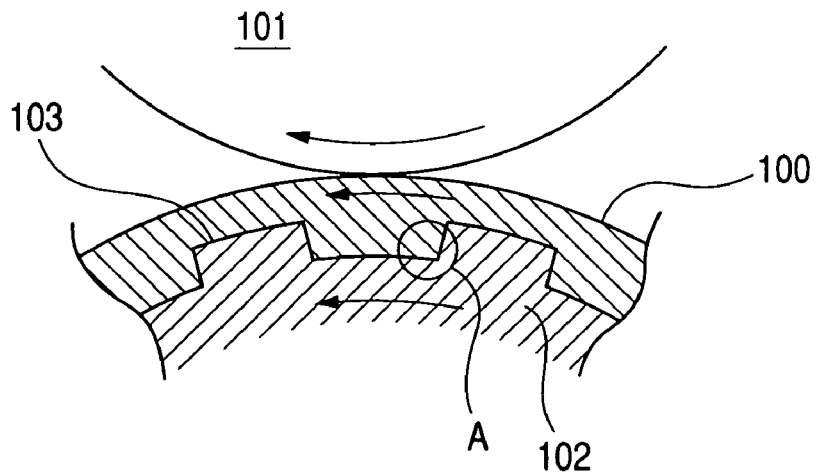
FIG. 5 is a sectional view showing the manufacture of a conventional clutch drum.
Figure 6:
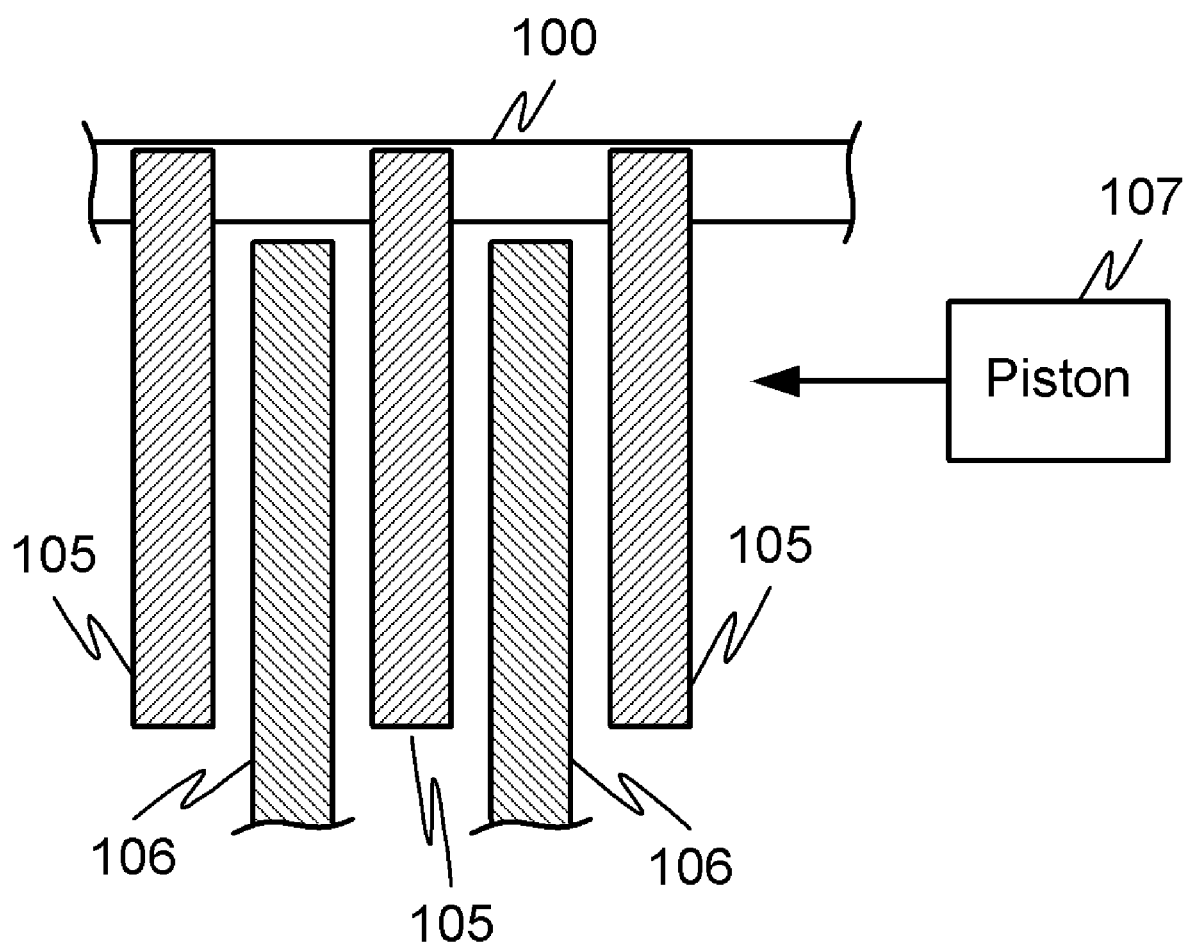
FIG. 6 is a schematic showing an arrangement of a conventional clutch drum.

Since these members are formed by the form rolling, the curved surface portion 3a of the shaping tool 2 and the curved surface portion 4a of the spline 5 are complementary with each other. During the form rolling, in a contact portion (corresponding to the area A in FIG. 5) in a rotational direction, which is apt to create the crack in the shaping tool 2, since the curved surface portion 3a and the curved surface portion 4a re contacted with each other, excessive stress can be suppressed during the form rolling. As a result, damage of the shaping tool 2 can be prevented.

Further, in a case where the clutch to which friction plates are mounted is operated, when a surface or edge of the clutch drum 1 opposite to the surface having the larger curvature, i.e. a surface or edge opposite to the curved surface portion 4a is used as a torque transmitting surface, an effective area of the tooth surface same as that of the conventional clutch can be maintained, thereby preventing indentation.

Figure 2:
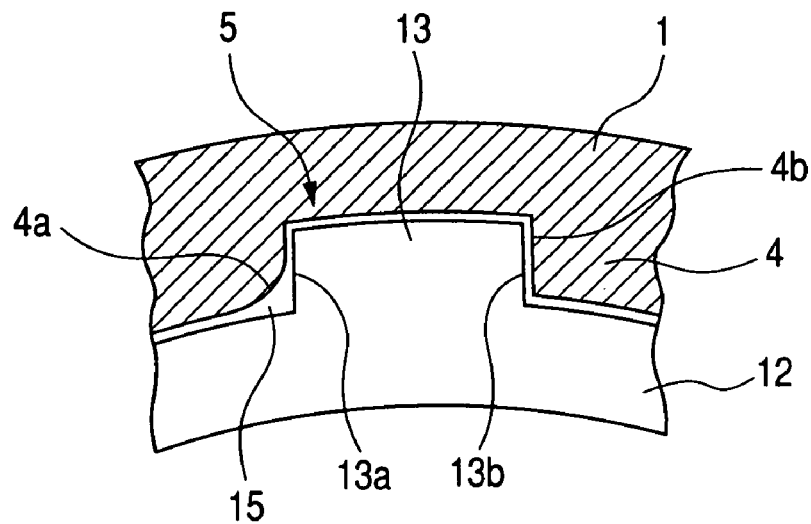
FIG. 2 is a partial front view showing a friction plate engaged by a clutch drum.

Next, engagement relationships between the clutch drum 1 and a friction plate 12 will be explained with reference to FIGS. 2 and 3. FIG. 2 is a partial front view showing a friction plate engaged by a clutch drum, and FIG. 3 is a partial front view showing a friction plate engaged by a clutch drum, illustrating an alteration of the friction plate.

In FIG. 2, a friction plate 12 is fitted in or engaged with a spline 5 of a clutch drum 1 in which splines are formed by form rolling. The friction plate 12 is provided at its outer periphery with a plurality of teeth 13 which are fitted into the corresponding splines 5. A curved surface portion 4a of a tooth 4 of the spline 5 is opposed to one circumferential edge portion 13a of the tooth 13 of the friction plate 12. Thus, a gap 15 extending in an axial direction is defined between the curved surface portion 4a and the substantially right angle edge portion 13a.

The gap 15 can also serve as an oil path for lubricating oil in the multi-plate clutch or an oil discharge passage in the clutch pack and contributes to reduction of drag torque and enhancement of a cooling effect in an idle rotation. Further, during the operation of the clutch, when torque is transmitted, since an engagement portion between an edge portion 13b and an edge portion 4b supports the load, surface pressure of the tooth surface can be reduced and occurrence of indentation can be prevented.

Figure 3:
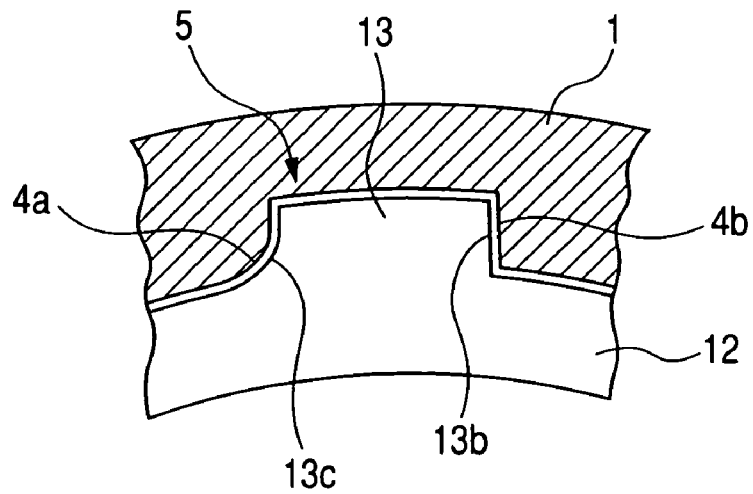
FIG. 3 is a partial front view showing a friction plate engaged by a clutch drum, illustrating an alteration of the friction plate.

FIG. 3 is a view showing alteration of the friction plate 12. In this example, one edge portion 13c of a tooth root of the tooth 13 of the friction plate 12 is formed as a curved surface having curvature complementary to that of the curved surface portion 4a of the spline 5. With this design, when the friction plates each of which has a friction material fixed to only one surface thereof are assembled, reverse arrangement of any friction plate 12 can be prevented.

Figure 4:
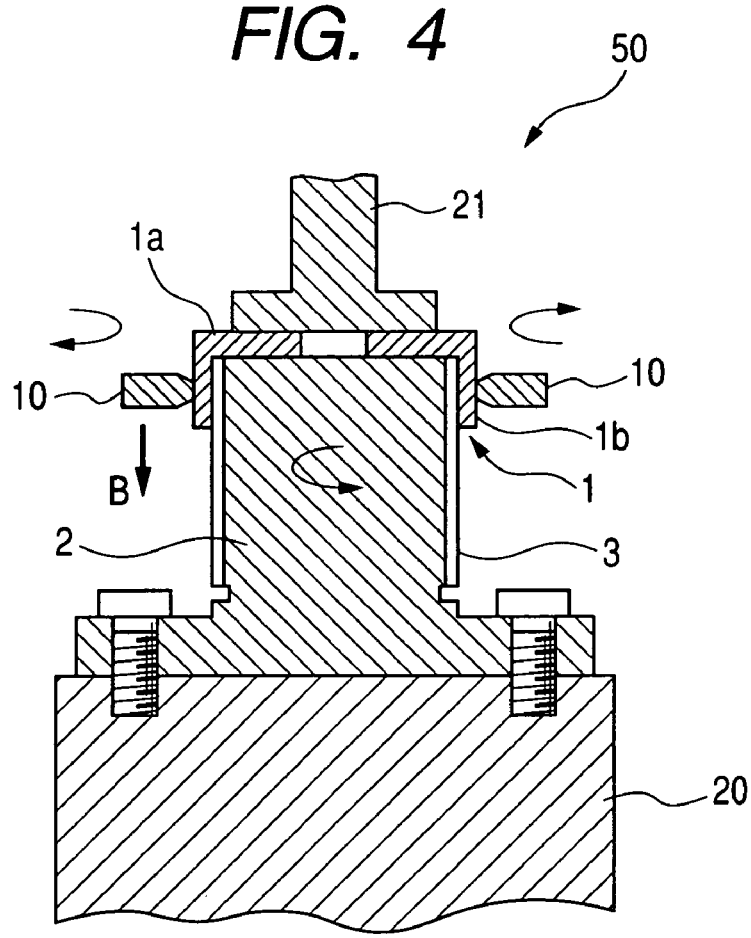
FIG. 4 is a sectional view of an apparatus for manufacturing a clutch drum of the present invention.

Next, a method for manufacturing the clutch drum according to the present invention will be explained with reference to FIG. 4. FIG. 4 is a sectional view of an apparatus for manufacturing the clutch drum according to the present invention. An apparatus 50 for manufacturing the clutch drum 1 comprises a mandrel 20, a shaping tool 2 secured onto the mandrel 20, and a pressing member 21 for pressing a work from the above to secure the work. A substantially cylindrical cup-shaped clutch drum 1 as the work is capped onto the shaping tool 2 and is held on the shaping tool 2 in a secured condition by means of the pressing member 21.

The clutch drum 1 comprises a disc portion 1a, and a cylindrical portion 1b having a substantially cylindrical inner periphery integral with the disc portion and extending in an axial direction from the disc portion 1a. A plurality of teeth 3 extending in the axial direction are formed on an outer periphery of the shaping tool 2 corresponding to the inner periphery of the clutch drum 1. The plurality of teeth 3 are arranged equidistantly along a circumferential direction and are protruded radially outwardly.

A plurality of rollers 10 are arranged around an outer periphery of the cylindrical portion 1b of the clutch drum 1 to be contacted with the cylindrical portion of the clutch drum. The rollers 10 are arranged equidistantly along the circumferential direction around the outer periphery of the clutch drum 1.

The clutch drum 1 is manufactured in the flowing manner by using the above-mentioned manufacturing apparatus 50. The clutch drum 1 having no internal splines is fitted onto the forming tool 2 mounted on and secured to the mandrel 20. The disc portion 1a of the clutch drum 1 is pinched between an upper surface of the shaping tool 2 and the pressing member 21 to be held stationary.

In an arrangement condition shown in FIG. 4, the shaping tool 2 for forming a tooth profile of the splines to be formed in the inner periphery of the clutch drum 1 and the rollers 10 are rotated in directions shown by the arrows in FIG. 4. Such rotational directions are the same as the rotational directions shown by the arrows in FIG. 1.

The rollers 10 urge the clutch drum 1 inwardly while contacting with the clutch drum 1 and rotating. By this form rolling, splines complementary to the teeth 3 provided on the outer periphery of the shaping tool 2 are formed in the inner peripheral surface of the clutch drum 1. As shown in FIG. 1, since the tooth root, at the leading edge in the rotational direction, of each tooth 3 of the shaping tool 2 has the curved surface, the tooth tip of each tooth of each spline of the clutch drum 1 is formed to have the curved surface portion 4a correspondingly.

During the form rolling, further, the roller 10 is shifted along the axial direction of the clutch drum 1, i.e. shifted to a direction shown by the arrow B in FIG. 4. As a result, a thickness of the clutch drum 1 is decreased and a length of the clutch drum is increased, and the splines 5 are formed in the inner peripheral surface of the clutch drum. In this way, the clutch drum 1 is completed.

The present invention can be applied to both of a wet type multi-plate clutch and a dry type multi-plate clutch. Further, the single or the plural rollers may be provided.

What is claimed is:

1. A clutch apparatus comprising:
a clutch drum provided at an inner periphery thereof with splines;
first rotary plates each of which is provided at an outer periphery thereof with teeth engaging said splines;
second rotary plates arranged alternately with said first rotary plates in an axial direction; and
a piston for applying an urging force in order to frictionally engage said first rotary plates and said second rotary plates with each other,
wherein each of said splines has a tooth tip having two circumferential ends, only one of said circumferential ends of the tooth tip having a curved surface, and
an oil path through which oil flows is bounded by said curved surface.

2. A clutch apparatus according to claim 1, wherein a tooth side surface adjacent to the other of said circumferential ends of each tooth tip is used as a torque transmitting surface.

3. A clutch apparatus according to claim 1, wherein the other of said circumferential ends of said tooth tip has a substantially right angle corner.

4. A clutch apparatus according to claim 1, wherein said first rotary plates are friction plates and said second rotary plates are separator plates.

5. A clutch apparatus according to claim 1, wherein said oil path is defined between said curved surface and a surface portion of one of the first rotary plates, said surface portion being opposed to the curved surface and being of non-complementary configuration with respect to said curved surface.

* * * * *